March 29, 1960  M. ATRAN  2,930,250
BALANCED, POINT EDGE CONTROL DEVICE FOR GAS PEDALS
Filed May 8, 1959
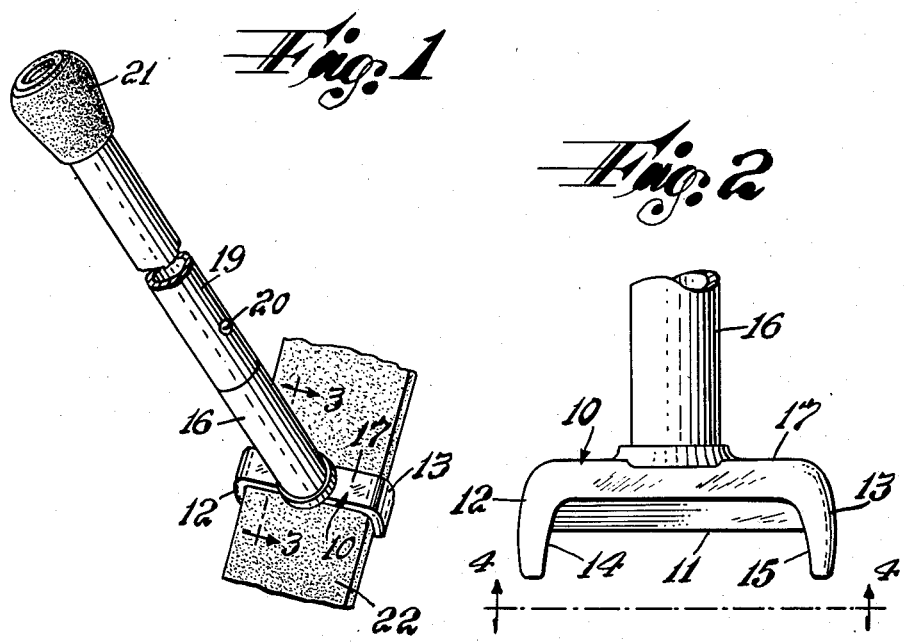
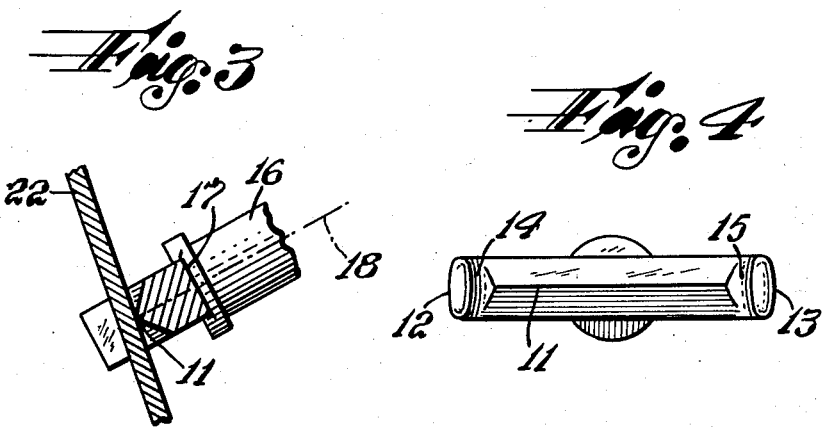
INVENTOR.
M. ATRAN
BY
ATTORNEY

United States Patent Office 2,930,250
Patented Mar. 29, 1960

2,930,250

BALANCED, POINT EDGE CONTROL DEVICE FOR GAS PEDALS

Max Atran, Teaneck, N.J.

Application May 8, 1959, Serial No. 811,924

3 Claims. (Cl. 74—482)

Gas pedals are conventionally pivotally mounted and maintained in normal (non feeding) position by pressure means against which the gas pedal must be depressed by the operator's foot. Conventional operation of the gas pedal by foot, especially on long trips, becomes fatiguing and harmful to the operator's health.

Pursuant to the invention, a gas pedal control device is provided enabling the operator to maintain precise control of the gas pedal while permitting him to rest and relieve his foot. The device may also be used in place of or as supplementary to conventional foot pressure.

The device is so designed as to be operative only while the operator maintains alert control, balance and dexterity, so that if he becomes drowsy or his senses are not properly coordinated for any other reason, the control device of the invention will automatically become inoperative.

Examples of practical devices embodying the invention are described below and in the accompanying drawings; the invention is not limited thereto, but covers all other forms coming within the scope or purview of the disclosure herein.

In the drawings:

Fig. 1 is a perspective, partly broken view of a gas control device embodying the invention, shown applied to a gas pedal, Fig. 2 is a fragmentary, elevational view of said device, Fig. 3 is a schematic view taken at line 3—3 of Fig. 1 and Fig. 4 is a bottom plan view, taken at line 4—4 of Fig. 2.

As shown in the drawings, the gas control device of the invention comprises an elongated bar portion 10 formed, along one face thereof, to a point edge 11, and having depending leg portions 12, 13 formed to extend beyond the point edge of said main body portion. The leg portions 12, 13 are formed with inner faces 14, 15 depending beyond said edge 11 of the bar 10 downwardly and outwardly tapered (Figs. 2 and 4). A handle member 16 is fixed to the main body portion of the bar 10 and extends from the face 17 thereof opposite the pointed edge 11 at a plane 18 (Fig. 3) substantially parallel to the plane at which the depending leg portions 12, 13 extend from the main body portion of the bar 10.

A second handle section 19 telescopically or slidably engages the fixed handle member 16 and is movable therealong to adjust the overall length of the handle to suit it to the user's wishes. The handle, at the free end thereof, may be covered with a knob 21 (Fig. 1) to facilitate manipulation.

The device is applied to the gas pedal 22 (Figs. 1 and 3) and positioned balanced thereon with the point edge 11 thereof in transverse contact with the outer face of the pedal 22 and with the depending leg portions 12, 13 of the bar 10 straddling the gas pedal (Fig. 1). Pressure may thus be applied to the pedal, partially or wholly relieving the operator's foot of the pedal depressing task. If the operator, due to fatigue or other reason, permits the control device to lose its balanced position on the pedal as above described, the control device will become disengaged.

The features above mentioned require continuous dexterity for balance and pressure to maintain engagement with the pedal, providing important safety factors in use of the device, in addition to the health saving features thereof above mentioned.

Having thus described my invention, what I claim as new and desire to secure by Letters Patent is:

1. A balanced, line edge gas pedal control device comprising an elongated bar portion formed along one face thereof to an elongated transverse sharp line edge and depending leg portions at the ends of said main body portion and extended beyond the transverse line edge of said main body portion, said bar portion being so proportioned that the line edge thereof may be positioned in contact with the outer face of the pedal to form the only connection with the operative surface of the gas pedal, with the depending leg portions of the bar straddling the sides of the pedal, and an elongated handle fixed to the main body portion and extended therefrom, whereby said bar edge may be moved by the user against the pedal with the leg portions straddling the pedal only as long as the user maintains point edge engagement of pedal control device on the outer face of the pedal in that position.

2. In a gas pedal control device as set forth in claim 1, said handle being so fixed to the main body portion by being extended from the face thereof opposite the pointed edge at a plane substantially parallel to the plane at which the depending leg portions extend from the main body portion of the bar.

3. In a gas pedal control device as set forth in claim 1, said handle comprising a member fixed to the main body portion of the straddle bar and a second handle section adjustably connected to the so fixed member, extending therefrom and defining therewith the so elongated handle.

References Cited in the file of this patent

UNITED STATES PATENTS

| | | |
|---|---|---|
| 2,481,966 | Zivi | Sept. 13, 1949 |
| 2,566,859 | Seeler | Sept. 4, 1951 |